United States Patent [19]

Nagao et al.

[11] 4,431,073
[45] Feb. 14, 1984

[54] TWO SPEED FINAL DRIVE GEAR BOX
[75] Inventors: Jay J. Nagao; Steven T. Dexter, both of Lafayette, Ind.
[73] Assignee: Fairfield Manufacturing Co., Inc., Lafayette, Ind.
[21] Appl. No.: 327,300
[22] Filed: Dec. 3, 1981
[51] Int. Cl.³ .............................................. B62D 11/04
[52] U.S. Cl. ................................... 180/6.48; 74/740; 180/70 MS; 180/307; 180/308
[58] Field of Search ...................... 180/6.48, 305, 307, 180/308, 75, 70 MS; 74/740, 414, 413, 867, 373, 74/375

[56] References Cited

U.S. PATENT DOCUMENTS

| | | | |
|---|---|---|---|
| 2,620,679 | 12/1959 | Issigonis et al. | 74/867 |
| 3,246,715 | 4/1966 | Pool et al. | 180/308 |
| 3,686,978 | 8/1972 | Knoblach et al. | 74/801 |
| 3,969,950 | 7/1976 | Rau et al. | 180/305 |
| 4,040,309 | 8/1977 | Wood et al. | 74/740 |

FOREIGN PATENT DOCUMENTS 69896  7/1940  Czechoslovakia ................. 180/75.1

*Primary Examiner*—John A. Pekar
*Assistant Examiner*—D. Lynn Fugate
*Attorney, Agent, or Firm*—John M. Neary; Vance A. Smith

[57] ABSTRACT

A ground vehicle final drive system includes a hydraulic motor powered by an engine driven pump, and a planetary gear final drive unit mounted between the frame of the vehicle and the wheel hub. A two-speed gear box is mechanically coupled between the hydraulic motor and the final drive unit and includes a remotely operable hydraulic shifter which can shift the two-speed gear box between two gear ratios by the use of a coupling that is splined to the output shaft and slides between an annular recess in one output gear and onto a spline connection on the other output gear.

9 Claims, 9 Drawing Figures

TWO SPEED FINAL DRIVE GEAR BOX

BACKGROUND OF THE INVENTION

Construction, industrial, agricultural, and mining machinery such as graders, rollers, compactors, crawlers, forklifts, combines, irrigation equipment, and so forth are now often driven by a hydraulic motor and a speed reduction gear box, commonly called a final drive, on each drive wheel. One such final drive is the "Torque-Hub" disclosed in U.S. Pat. No. 3,686,978 and sold by Fairfield Manufacturing Company of Lafayette, Indiana.

Final drives for construction, industrial, agricultural and mining equipment have proven to be of significant benefit in the design, manufacture and use of this equipment. The final drive is so compact that it can often be positioned within the wheel of the vehicle or within some other driven structure with as a roller or a track. This provides exceptional design flexibility to the designer of the equipment since he does not have to provide for bulky and expensive mechanical drive structures. In addition, the wheel, track or roller can be located and supported at a position on the equipment that is best suited for its function on the equipment rather than the design necessities of powering the wheel. In addition, this final drive arrangement permits the wheels to be independently driven for very fine, precise vehicle control and also to eliminate the need for a differential. Also, since the torque delivered to the wheels is delivered separately to each wheel, no one single drive shaft need carry the total torque as in conventional drive systems, so that the drive train from the hydraulic motors to the wheel can be designed to carry only half the total torque delivered to the vehicle as a whole. Finally, the use of a final drive arrangement enables the entire drive train from the prime mover to the wheel to be completely sealed against dirt, water and any other contaminant, using few seals, and mechanically covered so that all rotating parts except the wheel are concealed for operator safety.

Our analysis of the many uses to which these useful and versatile devices have been put has revealed to us one aspect of their operation wherein improvement could be made. The speed range of hydraulically powered machinery equipped with final wheel drives is often fairly narrow and is designed primarily for the usual operating speeds, but not for high speed travel between job sites. We believe the reason for this design philosophy is primarily a matter of cost. It was known that the wide speed range that is possible with hydraulic drives required a variable pump and a variable motor, whereas the narrower speed range required only a variable pump. It was thought that the cost required to move the equipment by trailer between job sites was less than the cost of providing a wider speed range and designing the equipment for stable operation at highway speeds.

We have concluded that this design philosophy is erroneous for much of the equipment that uses final wheel drives. The improvements to the drive train and to the vehicle steering and suspension necessary to enable it to drive on the highway safely at about 45 mph are much less expensive than the cost of trailering the vehicle between job sites, and the capability of moving rapidly between different locations within a single job site saves considerable operator and machine time. These savings enable the small additional investment in the original equipment to be recovered very quickly.

The cost of designing the higher speed ranges into the hydraulic drive system is indeed quite high. However, we have concluded that a two speed mechanical speed reducer used in conjunction with a hydraulic motor and a mechanical planetary final wheel drive would provide, in the combination, a greatly improved speed range and equal or better efficiency than performing the same speed variation function only hydraulically.

SUMMARY OF THE INVENTION

Accordingly, an object of this invention is to provide an improved drive system for the tractive elements of a vehicle which offers a wide speed range with high efficiency and low cost. Another object is to provide an improved final wheel drive system having a variable capacity pump, a fixed capacity motor, a two speed reduction gear box and a planetary gear hub drive which is sealed for long life and safety, is efficient, quiet, and durable, and is less expensive than a comparable hydraulic system. Yet another object of the invention is to provide a remotely shiftable two speed gear box that is efficient, smooth shifting, durable and inexpensive.

These objects are attained in one embodiment of the invention wherein a two speed gear box is interposed between a hydraulic motor and a planetary wheel hub final drive. The gear box has parallel input and output shafts. Two input gears fixed to the input shaft are in constant mesh with two output gears journaled on the output shaft. A shiftable coupling is splined to the output shaft and is movable between positions in which it is coupled to one or the other of the journaled output gears. A double acting, two position piston in a hydraulic cylinder controls the position of the coupling.

DESCRIPTION OF THE DRAWINGS

The invention and its many attendant objects and advantages will become better understood upon reading the following description of the preferred embodiment in conjunction with the accompanying drawings, wherein.

DESCRIPTION OF THE PREFERRED EMBODIMENT

Figure 1:
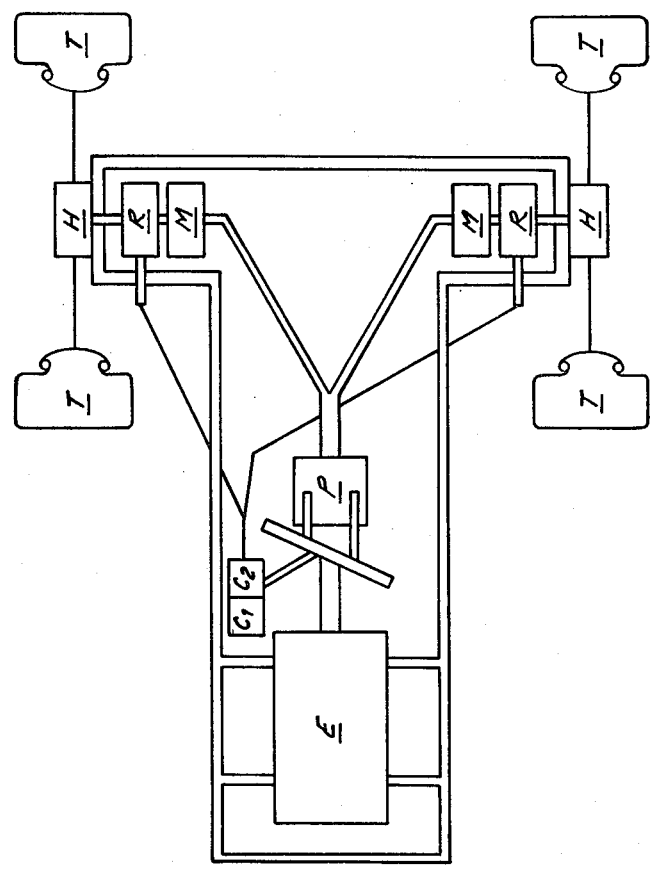
FIG. 1 is a schematic of a vehicle drive system made in accordance with this invention.

With reference now to the drawings, wherein like reference characters designate identical parts, and more particularly to FIG. 1 thereof, a drive system for a vehicle is shown having a prime mover E such as a diesel engine, powering a hydraulic power converter P such as variable capacity positive displacement pump. One hydraulic power converter which can be used is an axial piston pump whose pistons are driven by a swash plate whose angle can be controlled by a control mechanism $C_1$. A two branch hydraulic line $L_3$ connects the pump P to two hydraulic motors M which can be of the fixed displacement type for cost purposes. The motors could be of the variable displacement type, but since there are more than one, it is logical to make the motor as inexpensive as possible.

The motor M is mounted adjacent each driving input to the tractive drive elements T, such as ground engaging wheels or tracks. The motor is rigidly fastened to the vehicle frame F or to some other element rigidly mounted on the frame so that the reaction torque can be borne by the frame.

Figure 2:
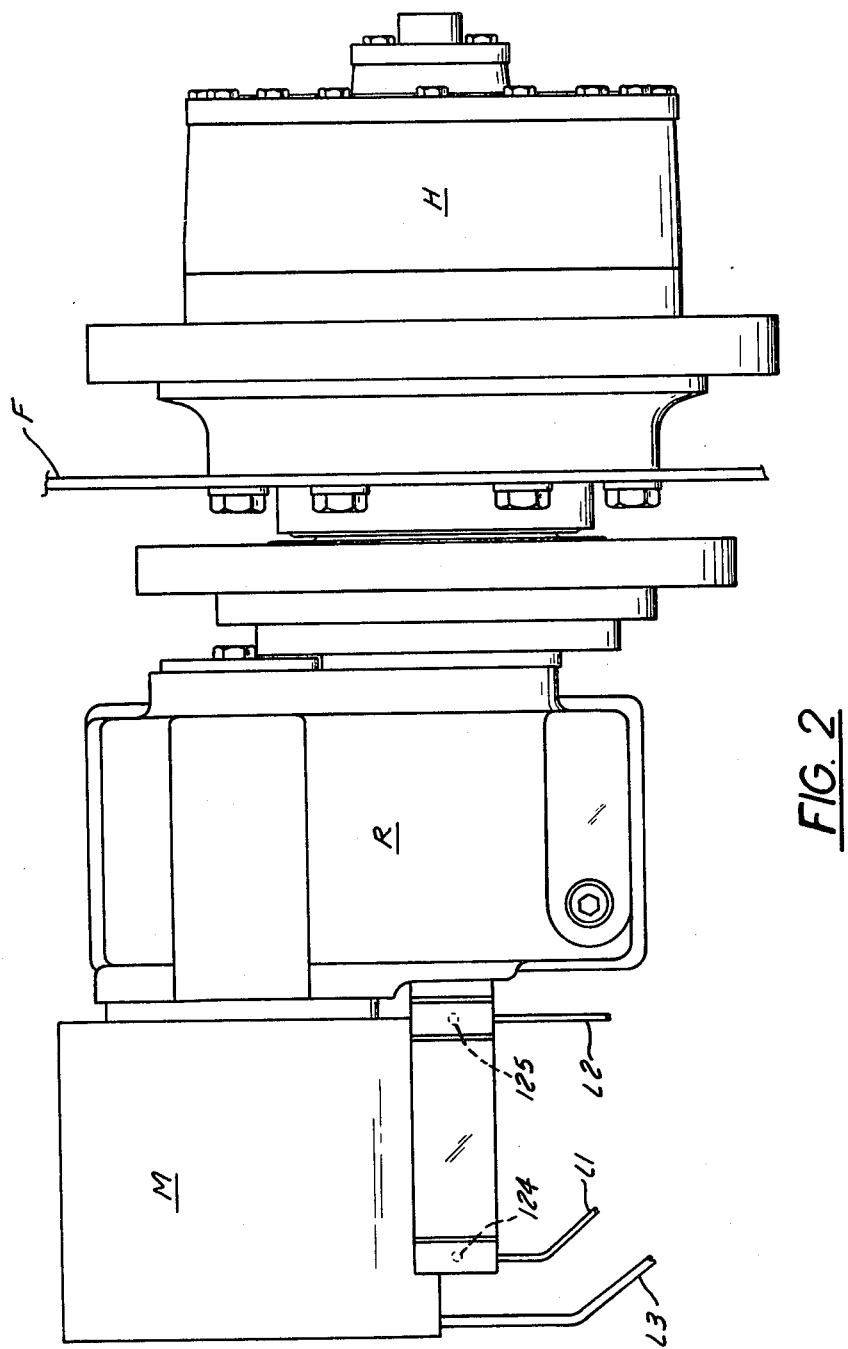
FIG. 2 is an elevation of one side of the vehicle drive system shown in FIG. 1 coupled to one of the vehicle tractive elements and seen from the side opposite to the side shown in FIG. 5.
Figure 3:
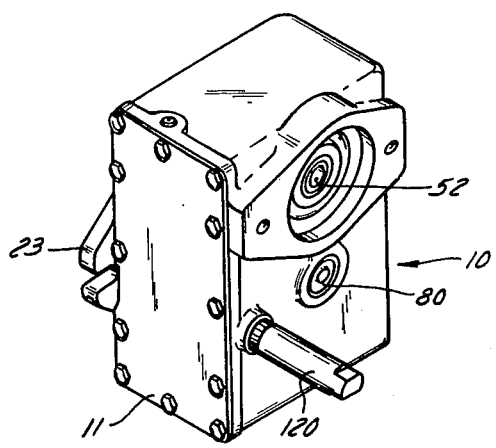
FIG. 3 is a perspective view of the two speed reduction gear box R shown in FIGS. 1 and 2.

The motor is mounted on the front face of a two speed gear box R having an internally splined input shaft which receives the motor output shaft S. The shaft S is actually not visible when the motor M is mounted on the gear box R, as shown in FIG. 2, because the motor mounting boss fits into an annular recess 27 in the gear box housing. The shaft S is shown schematically in FIG. 1 merely for purposes of clarity.

The gear box R has an output shaft 22 extending from its back face, which fits into the internally splined input coupling 78 of the final drive hub shown in the aforesaid U.S. Pat. No. 3,686,978, whose disclosure is hereby incorporated by reference. The output shaft 22 is actually concealed by the nesting of the gear box mounting boss 25 within the complementary recess 70 of the spindle flange 36 of the '978 patent, as shown in FIG. 2, but is shown schematically in FIG. 1 for clarity.

Figure 5:
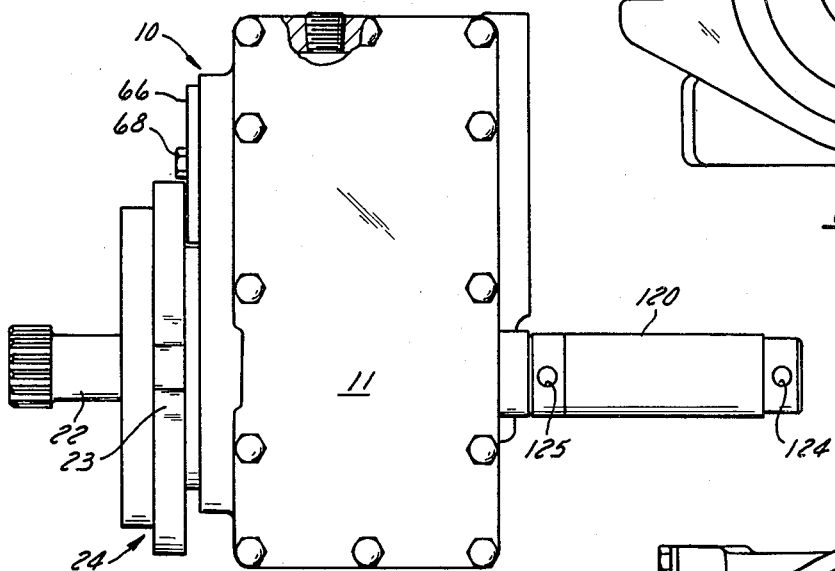
Figure 4:
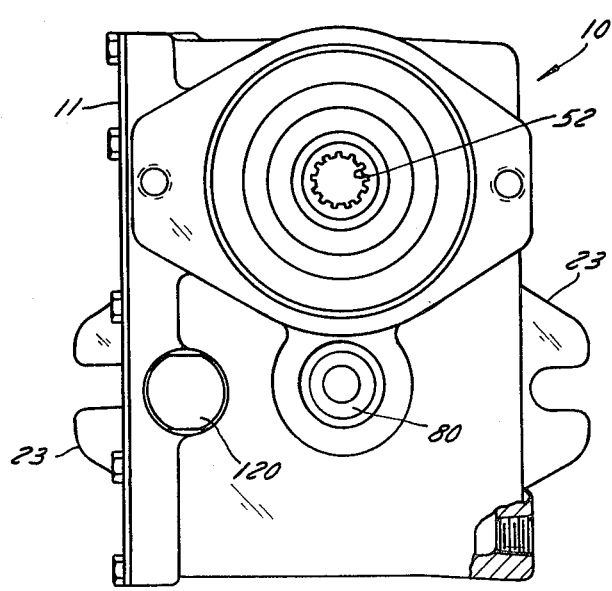

Turning now to FIGS. 3–7, the gear box R is shown having a housing 10 open on the side seen in FIG. 5, which opening is closed by a cover 11 bolted to the housing 10. The upper part of the housing 10 has a pair of openings 12 and 14 aligned on an axis 20 for receiving and supporting an input shaft 32, as explained below. The lower part of the housing has a pair of openings 16 and 18 aligned on an axis 22 for receiving and supporting an output shaft 70.

The gear box R includes complementary male and female mounting configurations 25 and 27 so that one face of the gear box housing 10 may be mounted on the hydraulic motor M and the opposite face of the housing may be mounted on the final drive hub. In this way, the gear box R may be mounted between the hydraulic motor and the final drive hub without modification of either of the latter two components.

A mounting member 24 having laterally extending slotted ears 23, an annular boss 25 on its outer face, and a collar 26 on its inner face is mounted on and fastened to the housing 10 by screws 28. The collar 26 extends into the opening 16 and is provided with a bore 30, also aligned on the axis 22.

The input shaft 32 is mounted in the openings 12 and 14 in the housing 10 on bearings 34 and 36, respectively. The bearings 34 and 36 are drawn cup needle bearing and are lubricated by lubricants within the housing 10. The input shaft 32 is a tubular, hardened steel shaft that is internally splined at 38 over the central portion of the shaft. The center and the extreme ends of the input shaft 32 have smooth cylindrical surfaces and the intermediate portions are provided with torque transmission configurations. The intermediate portion on the rear end of shaft 32 is provided with a gear 40 and the intermediate portion on the front end of shaft 32 is provided with a spline 42.

A hardened steel ferrule 44 is shrunk on or otherwise affixed to the rear end of the shaft 32 and is provided with a smooth exterior surface which acts as the bearing surface for the bearings 34. The purpose of the ferrule 44 is to cover the ends 46 of the grooves between the gear teeth 40 which are formed by the hobbing operation which forms the gear teeth. It is also an inexpensive technique for providing a high quality bearing surface of superior material and hardness so that the bearing surface may be tailored for the bearing function without the need to accommodate the strength, machineability, and cost considerations of the input shaft. Its primary purpose however is to enable a full width gear 40 and a full width bearing surface to be abutting, without the need to leave a gap where the grooves between the teeth of the gear 40 taper to the surface of the shaft 32. It would be possible to make the bearing surface on the shaft 32 of a small enough diameter so that the ends 46 of the grooves hobbed into the shaft 32 to make the gear 40 do not interfere with the bearing surface, however that would require that the assembly of the device be substantially more complicated. By making the maximum diameter of the ferrule 44 equal to or slightly greater than the maximum diameter of the teeth of the gear 40 and the splines 42, the shaft can be inserted into the housing through the opening 12 without interfering with the bearing 34.

An internally splined input gear 48 is mounted on the splines 42 of the input shaft 32 and is held onto the splines 42 by a snap ring 50. The front end of the shaft 32 is necked down at 52 and forms, at the junction of the spline 42, a shoulder 54. A corresponding shoulder 56 is formed by an undercut in the front face of the gear 48. The two shoulders 54 and 56 rotate at the same speed, since the gear 48 is splined onto the shaft 32 at the spline 42, so a single thrust washer 58 can engage both shoulders 54 and 56 without relative motion between the thrust washer 58 and the two shoulders. A second thrust washer 60 is provided to engage the inside face of a boss 62 through which the opening 14 is formed. The second thrust washer 60 and the first thrust washer 58 form the thrust bearing surfaces which engage the thrust rollers 64 of a thrust bearing.

Figure 6:
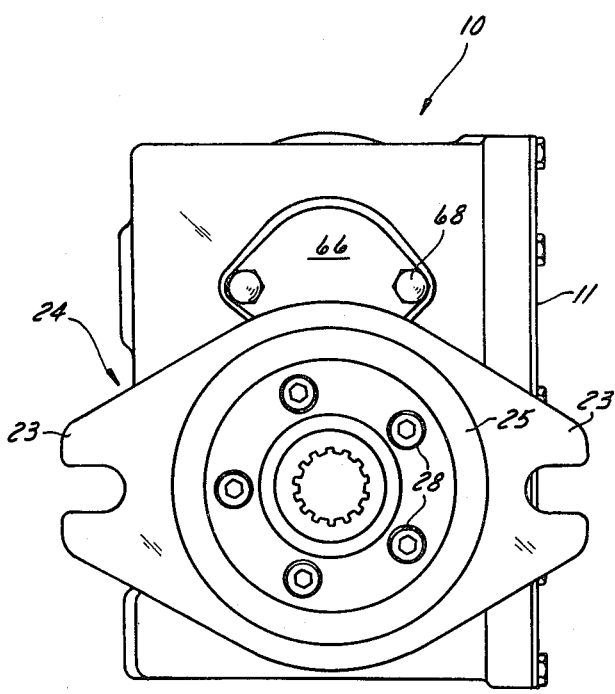
FIGS. 4–6 are front, side and back views, respectively, of the gear box shown in FIG. 3.

A cover plate 66 covers the opening 12 on the rear face of the housing 10 and is fastened in place by screws 68, seen in FIG. 6. The cover plate 66 provides an oil seal for the opening 12 and also provides a thrust surface for the shaft 32. The shaft 32 and the cover plate 66 are both hardened and the bearing interface is well lubricated so the small thrust forces on the shaft 32 are easily borne by the thrust interface between the plate 66 and the shaft 32. The spline coupling between the motor input shaft S and the shaft 32 prevents the transmission of any significant axial thrust forces between the shafts S and 32.

An output shaft 70 is journalled in the openings 30 and 18 in the mounting member 24 and the housing 10, respectively. The opening 30 in the mounting member 24 has a step 72 in the rear face thereof, coaxial with the axis 22, in which a seal 74 is mounted for preventing entrance of dirt into the housing 10 and preventing leakage of oil out of the housing 10. A bearing 76 is disposed in the opening 30 for supporting the rear end of the output shaft 70. A similar bearing 78 is mounted in the opening 18 on the front face of the housing 10 for supporting the front end of the output shaft 70. The bearing 78 is of the sealed variety which prevents entrance of dirt and leakage of oil from the housing by virtue of a closed or sealed end 80 on the bearing cup.

The center of the output shaft 70 has a spline 82 and two intermediate portions 84 and 86 abutting the rear and front edges of the spline 82, respectively. Two output gears 88 and 90 are journalled on the intermediate portions 84 and 86, respectively, of the shaft 70. The output gear 88 is journalled on a drawn cup needle bearing 92, which in turn is mounted on a ferrule 94 identical in size and material to the ferrule 44. A pair of thrust washers 96 is placed around the ferrule 94 between the rear face of the gear 88 and bearing 92, and the front face of the collar 26. A similar pair of thrust washers 98 is disposed between the front edge of the gear 88 and bearing 92, and a snap ring 100 fastened to the central splined portion 82 of the shaft 70.

An undercut 102 is formed in the front face of the output gear 88 forming a cylindrical or annular recess in the front face of the gear 88. On the inwardly facing radial surface of the undercut 102, an annular full circumference spline 104 is formed for coupling the output gear 88 with the output shaft 70 in a manner to be explained below.

The gear 90 is journaled on drawn cup needle bearings 106 on the intermediate portion 86 of the shaft 70. The gear 90 rotates relative to the shaft 70 when the gear 90 is decoupled from the shaft so that separate bearings from the bearings 78 are necessary. A thrust washer 108 is disposed in a recess formed on the rear face of a boss 110 through which the opening 18 is formed. The thrust washer 108 is formed of hardened bearing material and provides a low friction durable surface which would not be provided by the material of the housing 10, which is formed of a suitable housing material such as cast aluminum.

A coupling member 112 having an internally splined bore 113 is mounted on the central splined portion 82 of the shaft for axially sliding motion along the shaft 70 and for torque transmitting rotation with the shaft. The coupling member 112 has a splined portion 114 formed on the rear portion of its outwardly facing radial surface. The spline 114 is formed to correspond to the spline 104 on the inwardly facing radial surface of the recess 102 in the gear 88. When the coupling member 112 slides to the left in FIG. 7 to a position in which the spline 114 engages or nests with the spline 104, a torque coupling is created between the gear 88 through the coupling 112 at the engaged splines 104 and 114, and through the coupling to the output shaft 70 at the engagement of the internally splined bore 113 of the coupling member 112 and the splined central portion 82 of the shaft 70.

Figure 8:
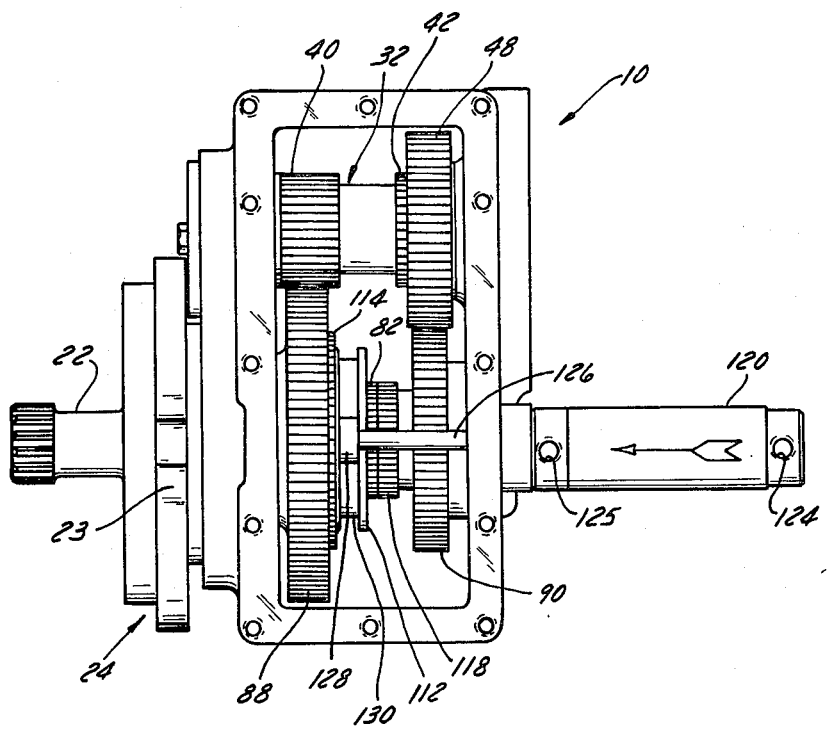
FIGS. 8 and 9 are elevations of the gear box of FIG. 3, oriented as in FIG. 5, with the cover removed and showing the shiftable coupling in its two positions, respectively.
Figure 9:
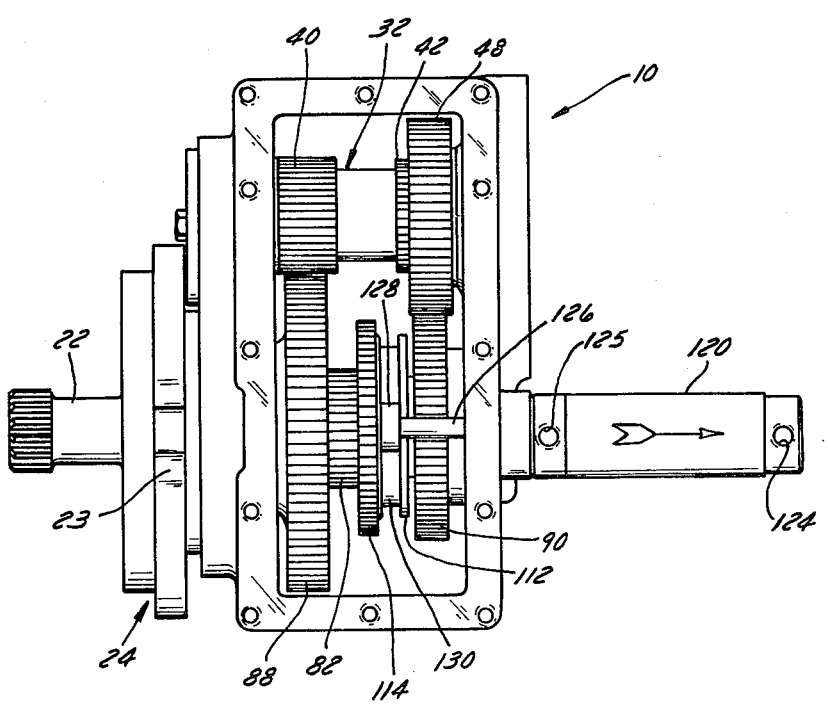

A collar 116 is formed on the rear face of the gear 90, and an external spline 118 is provided on the outwardly facing radial surface of the collar 116. The spline 118 matches the spline in the bore 113 of the coupling 112 so that the coupling 112 may be slid to the right in FIG. 7, from its position in FIG. 8 to its position in FIG. 9, to form a torque transmitting coupling between the collar 116 of the gear 90 and its spline 118, through the coupling 112 and its spline 113, thence to the spline 82 on the shaft 70.

Figure 7:
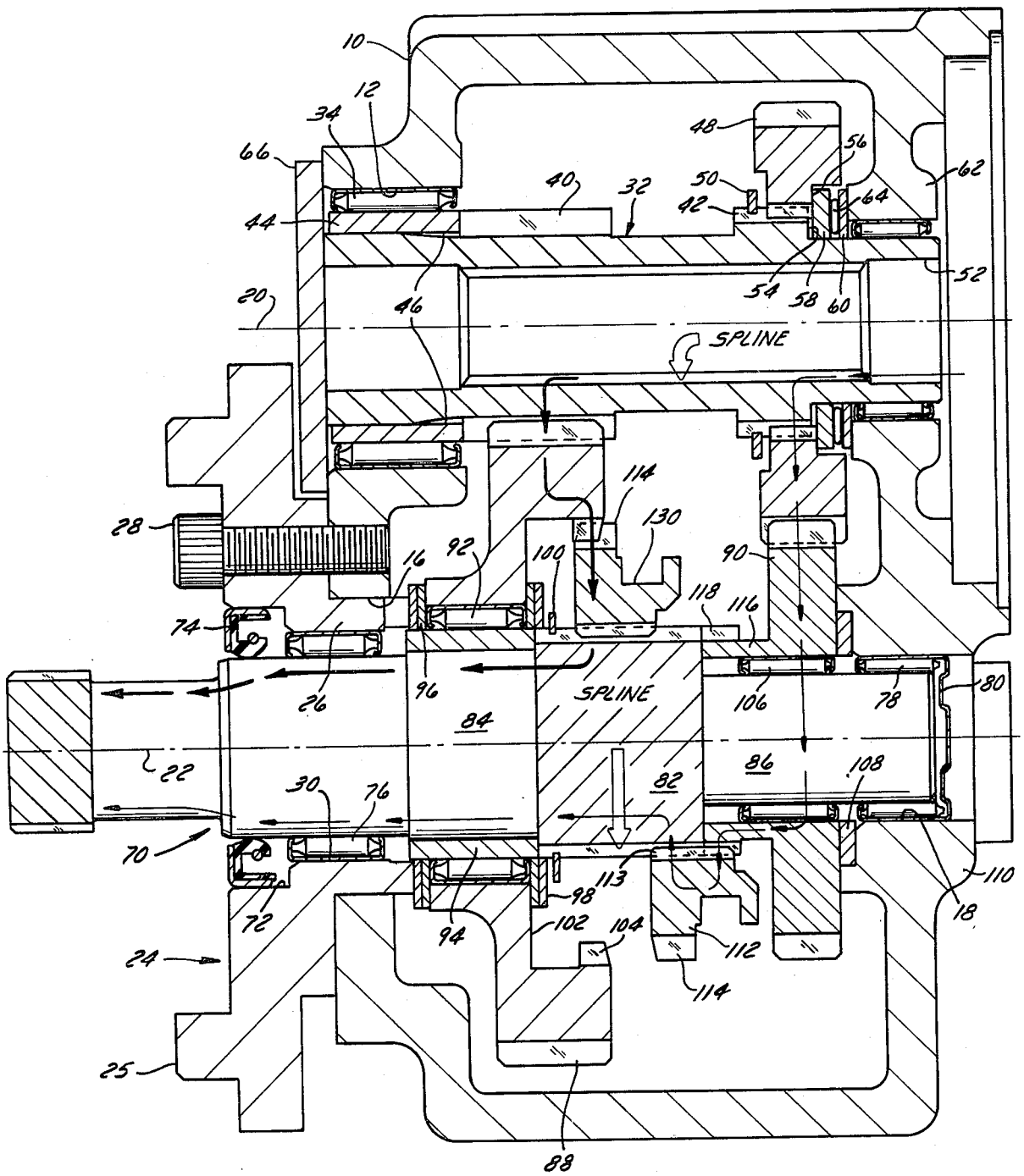
FIG. 7 is a sectional elevation of the gear box oriented as in FIG. 5.

A hydraulic cylinder 120, not seen in FIG. 7, is fastened to the housing 10 and includes a hydraulic piston which is axially slideable in the hydraulic cylinder 120 under the influence of hydraulic pressure delivered through suitable connectors 124 and 125 to which hydraulic lines $L_1$ and $L_2$ to a controller $C_2$ and a source of hydraulic pressure is attached. A hydraulic piston in the cylinder 120 is connected at its rear end to the front end of a rod 126. The rear end of the rod 126 is attached a fork 128 whose tines fit into a groove 130 in the coupling 112. When the piston is actuated by hydraulic pressure in the line $L_1$ or $L_2$ from the controller $C_2$, the fork causes the coupling 112 to slide axially along the splined portion 82 of the shaft 70 into engagement with the splined portions of one or the other of gears 88 and 90, thereby creating a torque transmitting connection between the coupled gear and the output shaft 70.

The two input gears 40 and 48 are in constant mesh with the output gears 88 and 90 so the problem with shifting the gears into and out of mesh is avoided. Instead, the shift from one gear ratio to another is done by moving the coupling 112 from one position of full circumferential peripheral engagement to another position of full circumferential peripheral engagement. This avoids the potential danger of shifting into and out of mesh in which only a small portion of one tooth is the only engaged portion between two gears, in which case damage to the gears may occur. The facing ends of the spline teeth on splines 104 and 114, and on splines 113 and 118 are beveled and rounded to facilitate engagement. Thus, it is very unlikely that the spline teeth on the coupling and on the gear will match up exactly so as to prevent engagement of the coupling with the gear. However, should such as unlikely event occur, the full circumferential peripheral engagement of the coupling 112 with the two gears 88 and 90 insures that the force exerted by the coupling on the gear will be perfectly axial rather than unbalanced. Thus, when the machine is started and one of the input gears rotates slightly, the coupling will slide smoothly into engagement with the output gear and the machine will operate without problem. If the force exerted by the coupling on the output gear were unbalanced, it could tend to cause the gear to tilt on the shaft and bind in that position. Then when the machine was started, the binding gear could be damaged or cause damage to the shaft.

Obviously, numerous modifications and variations of the disclosed preferred embodiment will occur to those skilled in the art in view of this disclosure. It is intended, therefore, that these modifications and variations, and the equivalents thereof, be encompassed within the spirit and scope of the invention as defined by the following claims, wherein

We claim:

1. A hydraulically shiftable, two speed final drive gear box for each driven wheel of a hydrostatically driven vehicle, comprising:

a housing (10) having complementary male and female mounting configurations (25, 27) so that one face of said housing may be mounted on a hydraulic motor and present, at the opposite face of said housing, a mounting configuration like that on said hydraulic motor;

an input shaft (32) and an output shaft (70) journaled for rotation in said housing about parallel axes;

first and second input gears (40, 48) coaxially mounted on said input shaft for torque transmission therewith;

first and second output gears (88, 90) journaled for rotation on said output shaft and in constant mesh with said first and second input gears, respectively;

a coupling (112) mounted axially slidable on said output shaft and linked thereto in torque transmitting relationship;

said coupling and said first and second output gears having full circumference, peripheral torque transmitting radially facing teeth (104, 113, 114, 118) adapted for selective 360° coupling between said coupling (112) and a selected one of said first and second output gears;

a fork (128) mechanically engaged with said coupling and movable axially in said housing to shift the axial position of said coupling (112) on said output shaft (70);

a hydraulic cylinder (120) connected to said housing;

a hydraulic piston (122) slidably disposed within said cylinder and connected to said fork;

a connector (124) in said hydraulic cylinder adapted to be coupled to a source of hydraulic fluid pressure to actuate said hydraulic piston;

whereby said coupling may be moved under hydraulic fluid pressure to couple said input and output shafts with the desired one of two gear ratios.

2. The device claimed in claim 1, wherein said teeth on said coupling and said output gears include splines, the facing axial ends of which are beveled and rounded to facilitate engagement when said coupling shifts.

3. The device claimed in claim 1, wherein said input shaft has a hardened steel ferrule (44) fixed to one end of said input shaft adjacent one of said input gears.

4. The device claimed in claim 1, wherein said coupling has outwardly facing radial torque transmitting teeth for engaging one of said output gears, and inwardly facing radial torque transmitting teeth for engaging the other of said output gears.

5. The device claimed in claim 4, wherein said one output gear has an annular undercut in one axially facing surface, said undercut having a radially facing surface in which said radially facing torque transmitting teeth are formed.

6. The device claimed in claim 1, wherein one of said configurations is formed of a mounting member connected to an opening in said housing and having a bore in which a bearing is mounted for supporting one end of one of said shafts.

7. The device claimed in claim 1, wherein one of said shafts has an output and having external splines of a certain configuration, and the other of said shafts has an input end that is hollow and of a configuration that would drivingly receive and engage said output end.

8. A hydrostatic vehicle drive system for powering the ground engaging tractive elements of a vehicle, comprising:

a prime mover for generating mechanical power;

a hydraulic drive system including a hydraulic power converter component coupled to said prime mover for converting the mechanical power from said prime mover to hydraulic power, and at least two hydraulic motors, each having an output shaft, one each of said motors being coupled to one of said tractive elements on each side of said vehicle, said hydraulic drive system having at least one component that is adjustable to vary the speed and torque of the motor output shafts; and a mechanical drive system including a mechanical drive assembly connected to each of said hydraulic motors, each assembly including;

(a) a planetary gear final drive unit having a spindle fixed to the frame of said vehicle, a hub rotatably mounted on said spindle, an input shaft extending through said spindle, and a planetary gear speed reduction, torque multiplication assembly connected between said input shaft and said hub, said hub being mechanically connected to said tractive element for driving it; and (b) a two-speed gear box mechanically coupled between said hydraulic motor output shaft and said final drive input shaft, said gear box having:
i. a housing having complementary male and female mounting configurations so that one face of said housing may be mounted on said hydraulic motor and present, at the opposite face of said housing, a mounting configuration like that on said hydraulic motor for mounting on said final drive unit;
ii. an input shaft and an output shaft on spaced, parallel axes, one of said shafts having an end having external splines of a certain form, and the other of said shafts having an end that is hollow and of a form that drivingly receives and engages another shaft of said certain form; said gear box shafts being coupled to said hydraulic motor and said final drive unit, respectively;
iii. two input gears mounted on said input shaft and two output gears mounted on said output shaft for rotation relative thereto and in constant mesh with said input gears, and a coupling member having full peripheral coupling surfaces movable between said output gears for selectively coupling said output gears with said output shaft;
iv. a hydraulically activated shifter means for shifting said coupling member between said output gears to provide two gear ratios for providing to said tractive elements two sets of speed/torque ranges, said shifter including a cylinder mounted on said housing and a piston movable in said cylinder under hydraulic pressure for moving said coupling in said housing between said output gears, and (c) means for actuating all of said shifters at all driven tractive elements simultaneously.

9. The hydrostatic vehicle drive system defined in claim 8, wherein said coupling member has outwardly facing radial torque transmitting teeth for engaging one of said output gears, and an axial bore in which are formed inwardly facing radial torque transmitting teeth for engaging corresponding teeth on said output shaft and the other of said output gears; said one output gear having an annular undercut in one axially facing surface, said undercut having an inwardly radially facing surface in which said inwardly radially facing torque transmitting teeth are formed;

the facing axial ends of said coupling teeth and said output gear teeth being beveled and rounded to facilitate engagement when said coupling shifts.

* * * * *